(12) United States Patent
Kaidu et al.

(10) Patent No.: US 9,000,705 B2
(45) Date of Patent: Apr. 7, 2015

(54) POWER CONTROLLER (75) Inventors: Hiroyuki Kaidu, Nagano (JP); Masato Aoki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 162 days.

(21) Appl. No.: 13/608,348

(22) Filed: Sep. 10, 2012

(65) Prior Publication Data
US 2013/0069564 A1 Mar. 21, 2013

(30) Foreign Application Priority Data

Sep. 16, 2011 (JP) .................................. 2011-202573

(51) Int. Cl.
*H02K 17/32* (2006.01)
*H02P 27/08* (2006.01)
*H02P 6/00* (2006.01)

(52) U.S. Cl.
CPC ................ *H02P 27/08* (2013.01); *H02P 6/002* (2013.01)

(58) Field of Classification Search
USPC .......... 318/434, 400.06, 400.21, 400.22, 700; 363/37, 41, 98
See application file for complete search history.

(56) References Cited

U.S. PATENT DOCUMENTS

| | | | | |
|---|---|---|---|---|
| 3,789,199 A * | 1/1974 | Kotwicki | ........................... | 708/3 |
| 5,945,802 A * | 8/1999 | Konrad et al. | ................ | 318/807 |
| 6,154,422 A * | 11/2000 | Shinkawa et al. | ............. | 368/204 |
| 6,538,404 B2 * | 3/2003 | Kato et al. | ............... | 318/400.06 |
| 6,570,779 B2 * | 5/2003 | Shimazaki et al. | ............. | 363/41 |
| 6,665,158 B2 * | 12/2003 | Walter | ............. | 361/18 |
| 6,826,062 B2 * | 11/2004 | Shinba | ............. | 363/40 |
| 7,126,300 B2 * | 10/2006 | Matsubara et al. | ...... | 318/400.22 |
| 8,144,443 B2 * | 3/2012 | Kim | ............................ | 361/93.1 |
| 8,174,226 B2 * | 5/2012 | Tsai et al. | ..................... | 318/434 |
| 8,395,340 B2 * | 3/2013 | Marvelly | ..................... | 318/434 |
| 8,654,483 B2 * | 2/2014 | Etter | ................ | 361/18 |
| 2004/0184206 A1 * | 9/2004 | Nomura et al. | ................. | 361/31 |
| 2006/0007620 A1 * | 1/2006 | Ochi | ............................ | 361/93.1 |
| 2007/0114944 A1 * | 5/2007 | Jang et al. | ....................... | 315/60 |
| 2007/0170900 A1 * | 7/2007 | Lee | ................ | 323/260 |
| 2010/0007295 A1 * | 1/2010 | Yang et al. | ............... | 318/400.22 |
| 2011/0181263 A1 * | 7/2011 | Maruyama | .................... | 323/284 |
| 2012/0075893 A1 * | 3/2012 | Higuchi | ......................... | 363/37 |

FOREIGN PATENT DOCUMENTS

JP 09-009672 A 1/1997
JP 2009-038854 A 2/2009

* cited by examiner

*Primary Examiner* — Rina Duda
*Assistant Examiner* — Bickey Dhakal
(74) *Attorney, Agent, or Firm* — Carrier Blackman & Associates, P.C.; Joseph P. Carrier; Jeffrey T. Gedeon (57) ABSTRACT There is provided a power controller including a drive circuit connected to a DC power supply to apply a first voltage to the drive circuit and configured to supply power to an external load, a current detection circuit configured to detect a current flowing in the drive circuit by converting the current into a second voltage corresponding to the current, and a current-voltage control unit configured to generate a reference voltage corresponding to a limit value of the current flowing in the drive circuit when the first voltage is applied to the drive circuit, and configured to control the drive circuit to operate in a desired current according to the first voltage, based on a comparison result of the reference voltage and the second voltage.

6 Claims, 4 Drawing Sheets

CONFIGURATION OF POWER CONTROLLER

FIG. 1

CONFIGURATION OF POWER CONTROLLER

RELATIONSHIP BETWEEN INPUT VOLTAGE
AND INPUT CURRENT LIMIT VALUE

FIG. 4A  RELATIONSHIP BETWEEN INPUT VOLTAGE AND INPUT CURRENT LIMIT VALUE IN MODIFIED ILLUSTRATIVE EMBODIMENT

POWER CONTROLLER

BACKGROUND OF THE INVENTION

1. Field of the Invention

The present invention relates to a power controller of a drive circuit for driving a load.

2. Description of the Related Art

Recently, an over-current protection circuit which detects over-current flowing in a drive circuit (such as an inverter circuit) and a load to protect a circuit element of a drive circuit or the load from over-current is widely used in a load (such as a motor) driving device (for example, JP-H09-009672A).

Further, there is used a switching power supply which detects power consumed by a drive circuit and a load to allow constant over-power protection, rather than by limiting over-current flowing in the drive circuit and the load (for example, JP-2009-038854A).

Specifically, JP-H09-009672A discloses an overload protection device which is capable of protecting an electric motor from overload due to a momentary change of an armature current. The overload protection device carries out control to detect a current flowing in an electric motor 1 and makes an armature current to zero or limits the armature current below a limit value when a detected current signal exceeds a reference signal.

JP-2009-038854A discloses a low-cost control device (switching power supply) capable of suppressing torque pulsation of AC motor.

The overload protection device disclosed in JP-H09-009672A is effective to carry out over-current protection by limiting an input current. However, there is a problem that over-power protection cannot be carried out. On the other hand, the control device disclosed in JP-2009-038854A is capable of carrying out over-power protection and controls an over-current protection at a constant power, irrespective of a value of input voltage. Therefore, there is a concern that a large current would flow when voltage is low. Consequently, there is a problem that the circuit components are damaged by the large current and thus a malfunction may be caused.

SUMMARY OF THE INVENTION

The present invention has been made in view of the above circumstances, and it is an object of the present invention to provide a power controller capable of enabling over-current protection, over-voltage protection and over-power protection of the drive circuit.

According to an illustrative embodiment of the present invention, there is provided a power controller comprising: a drive circuit connected to a DC power supply to apply a first voltage to the drive circuit and configured to supply power to an external load; a current detection circuit configured to detect a current flowing in the drive circuit by converting the current into a second voltage corresponding to the current; and a current-voltage control unit configured to generate a reference voltage corresponding to a limit value of the current flowing in the drive circuit when the first voltage is applied to the drive circuit, and configured to control the drive circuit to operate in a desired current according to the first voltage, based on a comparison result of the reference voltage and the second voltage.

According to the above configuration, it is possible to provide a power controller capable of enabling over-current protection, over-voltage protection and over-power protection of a drive circuit.

DETAILED DESCRIPTION

Hereinafter, illustrative embodiments of the present invention will be described in detail by referring to the accompanying drawings.

Configuration of Illustrative Embodiment

Figure 1:
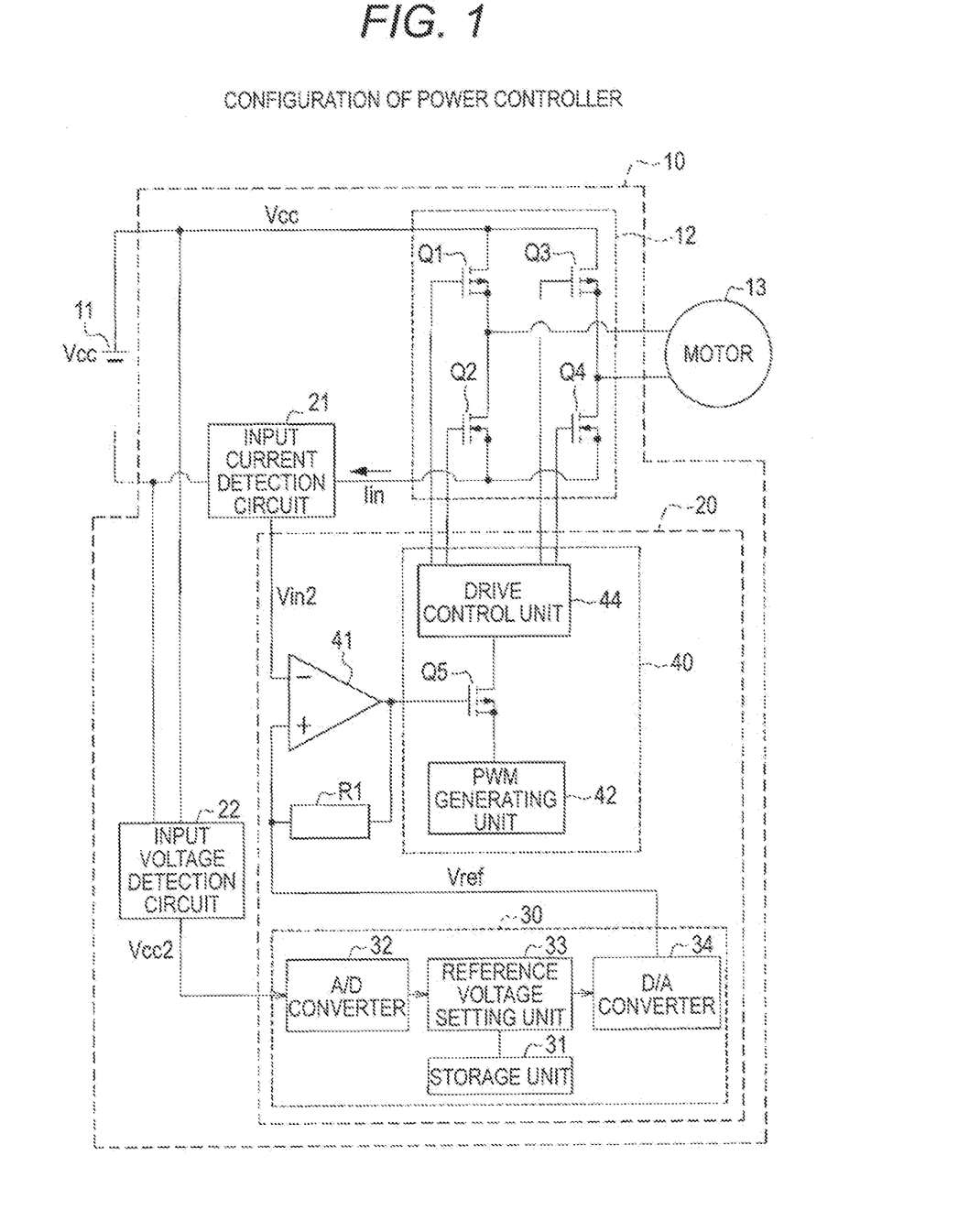
FIG. 1 is a schematic view illustrating a configuration of a power controller according to an illustrative embodiment.

FIG. 1 is a schematic view illustrating a configuration of a power controller 10 according to an illustrative embodiment.

(Overall Configuration of Power Controller 10)

The power controller 10 includes an inverter circuit 12 (drive circuit), a current-voltage control unit 20, an input current detection circuit 21 (current detection circuit) and an input voltage detection circuit 22 (voltage detection circuit).

The power controller 10 is configured to drive a motor 13 (external load) by supplying power to the motor 13.

A positive side input terminal of the power controller 10 is connected to an input side of a DC power supply 11, and a negative side input terminal of the power controller 10 is connected to a negative side of the DC power supply 11. An input voltage Vcc is applied between the positive side input terminal and the negative side input terminal. Two AC output terminals of the power controller 10 are connected to the motor 13 (external load) and thus supply a driving power to drive the motor 13 when an AC voltage is applied to the power controller 10.

The DC power supply 11 is, for example, a constant voltage source and configured to apply a predetermined voltage to the power controller 10.

A positive side of the DC power supply 11 is connected to a positive side input terminal of the inverter circuit 12 and a positive side input terminal of the input voltage detection circuit 22. A negative side of the DC power supply 11 is connected to a negative side input terminal of the input voltage detection circuit 22 and also connected to a negative side input terminal of the inverter circuit 12 via the input current detection circuit 21. The DC power supply 11 is configured to apply a predetermined voltage between the positive side input terminal and the negative side input terminal of the inverter circuit 12 and between the positive side input terminal and the negative side input terminal of the input voltage detection circuit 22.

The inverter circuit 12 (drive circuit) is configured to supply a driving power to the motor 13 (external load) by applying an AC voltage to the motor 13. Each component configuring the inverter circuit 12 will be described in a later section "Configuration of inverter circuit 12".

The positive side input terminal of the inverter circuit 12 is connected to the positive side of the DC power supply 11, and the negative side input terminal thereof is connected to the negative side of the DC power supply 11 via the input current detection circuit 21. In this manner, the input voltage Vcc (first voltage) is applied between the positive side input terminal and the negative side input terminal. The inverter circuit 12 is configured such that four control input terminals are connected to an output terminal of the current-voltage control unit 20, and a drive control signal is inputted to the four control input terminals. Further, the inverter circuit 12 is configured such that two AC output terminals are connected to the motor 13 (external load) and supplies a driving power when AC voltage is applied to the motor 13 (external load).

The input voltage detection circuit 22 is configured to convert the input voltage Vcc into the input voltage Vcc2 so as not to exceed a maximum allowable voltage of the A/D (Analog to Digital) converter 32 (described later).

A positive side input terminal of the input voltage detection circuit 22 is connected to the positive side of the DC power supply 11 and a negative side input terminal of the input voltage detection circuit 22 is connected to the negative side of the DC power supply 11. In this manner, an input voltage Vcc applied between the positive side input terminal and the negative side input terminal is detected. Further, an output terminal of the input voltage detection circuit 22 is connected to one input terminal of the current-voltage control unit 20 to output the input voltage Vcc2 to the current-voltage control unit 20. The input voltage detection circuit 22 is, for example, a resistor voltage-dividing circuit configured by two resistors which are connected in series between the positive side and the negative side of the DC power supply 11. The input voltage detection circuit 22 is configured to convert the input voltage Vcc applied between the positive side and the negative side of the DC power supply 11 into the input voltage Vcc2 proportional to the input voltage Vcc and output the input voltage Vcc2.

The input current detection circuit 21 is connected in series between a negative side of the DC power supply 11 and a negative side of the inverter circuit 12 and configured to detect the input current Iin flowing in the inverter circuit 12.

Two input terminals of the input current detection circuit 21 are connected in series between the negative side of the DC power supply 11 and the negative side of the inverter circuit 12, and the input current Iin flowing in the inverter circuit 12 flows between two input terminals. An output terminal of the input current detection circuit 21 is connected to the other input terminal of the current-voltage control unit 20, and a voltage Vin2 (second voltage) corresponding to the input current Iin is detected and outputted. The input current detection circuit 21 is, for example, a shunt resistor which is connected in series between the negative side of the DC power supply 11 and the negative side of the inverter circuit 12. In this case, the value obtained by dividing the voltage difference between both ends of the shunt resistor by the resistance value of the shunt resistor becomes the input current Iin. That is, the input current detection circuit 21 converts the input current Iin flowing in the inverter circuit 12 into a voltage Vin2 corresponding to the input current Iin to output the voltage Vin2.

The current-voltage control unit 20 outputs a predetermined drive control signal to control an operation of the inverter circuit 12. Further, the current-voltage control unit 20 carries out over-current protection, over-voltage protection and over-power protection for the inverter circuit 12, based on the input voltage Vcc applied to the inverter circuit 12 and the input current Iin flowing in the inverter circuit 12. Each component configuring the current-voltage control unit 20 will be described in a later section "Configuration of current-voltage control unit 20".

An output terminal of the input voltage detection circuit 22 is connected to one input side of the current-voltage control unit 20, and the input voltage Vcc2 obtained by dividing the input voltage Vcc is applied to the one input side. An output terminal of the input current detection circuit 21 is connected to the other input side of the current-voltage control unit 20 and a voltage Vin2 corresponding to the input current Iin is applied to the other input side. Four output terminals of the current-voltage control unit 20 are connected to four control terminals of the inverter circuit 12 and output a predetermined drive control signal to control the inverter circuit 12 operate in a current less than a desired current according to the input voltage Vcc.

The motor 13 (external load) is driven by the inverter circuit 12 (drive circuit).

The motor 13 is connected to two AC output terminals of the inverter circuit 12. As AC voltage is applied to the AC output terminal, a driving power is supplied to drive the motor 13.

(Configuration of Inverter Circuit 12)

The inverter circuit 12 includes four switching elements Q1 to Q4.

Each of the switching elements Q1 to Q4 is, for example, FET (Field Effect Transistor) and is configured to control the conduction between two input terminals of a drain terminal and a source terminal by applying H-level signal or L-level signal to a gate terminal which is a control terminal. Further, the switching elements Q1 to Q4 respectively perform a switching operation by a predetermined drive control signal applied to each control terminal and thus apply an AC voltage to the motor 13 (load) connected to the AC output terminals to drive the motor 13.

A first switching leg is configured by connecting the switching elements Q1, Q2 in series and a second switching leg is configured by connecting the switching elements Q3, Q4 in series. The first switching leg and the second switching leg are respectively connected in parallel between the positive side input terminal and the negative side input terminal of the inverter circuit 12. The control terminal of each switching element Q1 to Q4 is respectively connected to four output terminals of the current-voltage control unit 20, and therefore, a predetermined drive control signal is inputted to the control terminals. Further, a node between the switching elements Q1, Q2 and a node between the switching elements Q3, Q4 are two AC output terminals of the inverter circuit 12 and respectively connected to the motor 13 to apply an AC voltage to the motor 13.

(Configuration of Current-Voltage Control Unit 20)

The current-voltage control unit 20 includes a reference voltage generating unit 30, a comparator 41, an inverter circuit control unit 40 and a resistor R1.

The reference voltage generating unit 30 is configured to generate and output a reference voltage Vref, based on the input voltage Vcc2 obtained by dividing the input voltage Vcc. Here, the reference voltage Vref refers to a voltage value corresponding to a maximum value of an input current Iin which is controlled according to the input voltage Vcc. Each component configuring the reference voltage generating unit 30 will be described in a later section "Configuration of reference voltage generating unit 30".

An output terminal of the input voltage detection circuit 22 is connected to the reference voltage generating unit 30 to input the input voltage Vcc2. An output terminal of the reference voltage generating unit 30 is connected to a non-inverting input terminal of the comparator 41 to output the reference voltage Vref.

The comparator 41 outputs L-level signal (stop signal) from an output terminal to stop the inverter circuit control unit 40 when the voltage Vin2 applied to an inverting input terminal is greater than the reference voltage Vref applied to the non-inverting input terminal. In other cases, the comparator outputs H-level signal. That is, the comparator 41 compares the reference voltage Vref and the voltage Vin2 and outputs L-level signal (stop signal) when the voltage Vin2 is greater than the reference voltage Vref.

An output terminal of the reference voltage generating unit 30 is connected to the non-inverting input terminal of the comparator 41 to apply the reference voltage Vref. And, an output terminal of the input current detection circuit 21 is connected to the inverting input terminal of the comparator 41 to apply the voltage Vin2. An output terminal of the comparator 41 is connected to the inverter circuit control unit 40 to output the stop signal based on a predetermined condition.

Further, the resistor R1 is connected between the non-inverting input terminal and the output terminal of the comparator 41. The comparator 41 carries out Schmitt trigger action by the resistor R1. The comparator 41 prevents the outputted signal from frequently changing from H-level to L-level (stop signal) when the voltage Vin2 applied to an inverting input terminal and the reference voltage Vref applied to the non-inverting input terminal are close to each other.

The inverter circuit control unit 40 controls to stop the supply of power to the motor 13 by the inverter circuit 12 when L-level signal (stop signal) is inputted from the comparator 41. Each component configuring the inverter circuit control unit 40 will be described in a later section "Configuration of inverter circuit control unit 40".

An output terminal of the comparator 41 is connected to an input terminal of the inverter circuit control unit 40 to input the stop signal based on a predetermined condition. Four output terminals of the inverter circuit control unit 40 are connected to a control terminal of the inverter circuit 12 to output a predetermined drive control signal.

(Configuration of Reference Voltage Generating Unit 30)

The reference voltage generating unit 30 includes a storage unit 31, an A/D (Analog to Digital) converter 32, a reference voltage setting unit 33 and a D/A (Digital to Analog) converter 34.

The storage unit 31 is, for example, a ROM (Read Only Memory), a RAM (Random Access Memory) or the like and stores a predetermined conversion table which represents a corresponding relationship between the input voltage Vcc2 and the reference voltage Vref to generate the reference voltage Vref based on the input voltage Vcc2.

The storage unit 31 is connected to be readable from the reference voltage setting unit 33.

The A/D converter 32 is configured to convert the input voltage Vcc2 (which is an analog signal) into a first digital value.

An input side of the reference voltage generating unit 30 is an input side of the A/D converter 32 to which an output terminal of the input voltage detection circuit 22 is connected to apply the input voltage Vcc2. An output side of the A/D converter 32 is connected to the reference voltage setting unit 33 to output the first digital value corresponding to the input voltage Vcc2 obtained by dividing the input voltage Vcc. That is, the A/D converter 32 outputs the first digital value corresponding to the input voltage Vcc.

The reference voltage setting unit 33 is configured to convert the first digital value corresponding to the input voltage Vcc2 into a second digital value corresponding to the reference voltage Vref, based on the predetermined conversion table stored in the storage unit 31. The input voltage Vcc and the input voltage Vcc2 are proportional to each other, and therefore, the first digital value substantially corresponds to the input voltage Vcc.

An output side of the A/D converter 32 is connected to an input side of the reference voltage setting unit 33 to input the first digital value. An output side of the reference voltage setting unit 33 is connected to an input side of the D/A converter 34 to output the second digital value. Further, the storage unit 31 is connected to be readable from the reference voltage setting unit 33.

The D/A converter 34 is configured to convert the inputted second digital value into the reference voltage Vref (which is an analog voltage signal) and to output the reference voltage Vref from the output terminal thereof.

An output side of the reference voltage setting unit 33 is connected to an input side of the D/A converter 34 to input the second digital value. An output terminal of the D/A converter 34 is an output side of the reference voltage generating unit 30, to which the non-inverting input terminal of the comparator 41 is connected, to output the reference voltage Vref.

(Configuration of Inverter Circuit Control Unit 40)

The inverter circuit control unit 40 includes a PWM (Pulse Width Modulation) generating unit 42, a switching element Q5 (switching unit) and a drive control unit 44.

The PWM generating unit 42 is configured to generate and output a PWM signal having a predetermined duty. An input terminal of the switching element Q5 is connected to an output side of the PWM generating unit 42 to input the PWM signal.

The switching element Q5 is, for example, FET (Field Effect Transistor) and is configured to shut off the conduction between a source terminal as an input terminal and a drain terminal as an output terminal when L-level signal (stop signal) is applied to a gate terminal which is a control terminal.

The input terminal of the switching element Q5 is connected to an output side of the PWM generating unit 42 to input the PWM signal. The control terminal of the switching element Q5 is connected to an output terminal of the comparator 41 to input the stop signal. The output terminal of the switching element Q5 is connected to the drive control unit 44 to output the PWM signal while the stop signal is not inputted to the control terminal.

The drive control unit 44 is configured to output a predetermined drive control signal to each of four control terminals of the inverter circuit 12 by the inputted PWM signal. The drive control unit 44 determines a pattern of the predetermined drive control signal and outputs the determined pattern to the inverter circuit 12, so that the inverter circuit 12 outputs an AC voltage based on the duty of the PWM signal. That is, the drive control unit 44 can output a pattern of the predetermined drive control signal according to the duty of the PWM signal to the inverter circuit 12.

The input terminal of the drive control unit 44 is connected to an output terminal of the switching element Q5 to input the PWM signal. Four output terminals of the drive control unit 44 is respectively connected to four control terminals of the inverter circuit 12 to output the predetermined drive control signal.

Operation of Illustrative Embodiment

An operation of the power controller 10 will be described by referring to FIG. 1.

In the power controller 10, the input voltage Vcc between the positive side and negative side of the DC power supply 11 is divided into the input voltage Vcc2 proportional to the input voltage Vcc by the input voltage detection circuit 22, and the divided input voltage Vcc2 is outputted to the reference voltage generating unit 30. The reference voltage generating unit 30 converts the input voltage Vcc2 into the reference voltage Vref corresponding to a limit value (maximum value) of the input current Iin according to the input voltage Vcc2 and then outputs the reference voltage to a non-inverting input terminal of the comparator 41.

Meanwhile, in the power controller 10, the input current Iin flowing in the DC power supply 11 is converted at high speed into the voltage Vin2 corresponding to the input current Iin by the input current detection circuit 21, and the converted voltage is outputted to an inverting input terminal of the comparator 41.

In the power controller 10, the reference voltage Vref and the voltage Vin2 are compared by the comparator 41. And, L-level stop signal is outputted to the inverter circuit control unit 40 when the voltage Vin2 is greater than the reference voltage Vref.

In the power controller 10, the load driving operation of the inverter circuit 12 is stopped by the inverter circuit control unit 40 when the L-level stop signal is inputted from the comparator 41. Thereby, the motor 13 stops driving.

As the L-level stop signal is outputted from the comparator 41, the switching element Q5 is switched to an off-state. The PWM signal outputted from the PWM generating unit 42 is shut off by the switching element Q5 and therefore is not inputted to the drive control unit 44. The drive control unit 44 stops the output of a drive control signal to the inverter circuit 12 when the PWM signal is not inputted thereto. Instead, the drive control unit 44 outputs a signal to shut off the conduction of all the switching elements Q1 to Q4. The inverter circuit 12 stops the on/off control of the switching elements Q1 to Q4, and thus, a driving power is not supplied to the motor 13.

When a normal operation is carried out, i.e., when the voltage Vin2 corresponding to the input current Iin is equal to or less than the reference voltage Vref, H-level signal is outputted from an output terminal of the comparator 41. At this time, the output signal of the comparator 41 is not L-level signal, and thus, a stop signal is not outputted.

H-level signal which is an output signal of the comparator 41 is applied to a control terminal of the switching element Q5, and thus, the switching element is switched to an on-state. At this time, the PWM signal is outputted from the PWM generating unit 42 and inputted to the drive control unit 44 via the switching element Q5. The drive control unit 44 carries out the on/off control of the switching elements Q1 to Q4 of the inverter circuit 12, based on the duty of the PWM signal. Accordingly, a driving power is supplied to the motor 13.

In the power controller 10 of the illustrative embodiment, in order to suppress an unstable switching operation (changeover operation) when the voltage Vin2 corresponding to the input current Iin and the reference voltage Vref are close to each other, a resistor R1 is added to the comparator 41 to give hysteresis, and thus, Schmitt trigger action is achieved. That is, the comparator 41 carries out the fine adjustment of the reference voltage Vref in a negative direction when L-level signal is outputted and carries out the fine adjustment of the reference voltage Vref in a positive direction when H-level signal is outputted.

Figure 2:
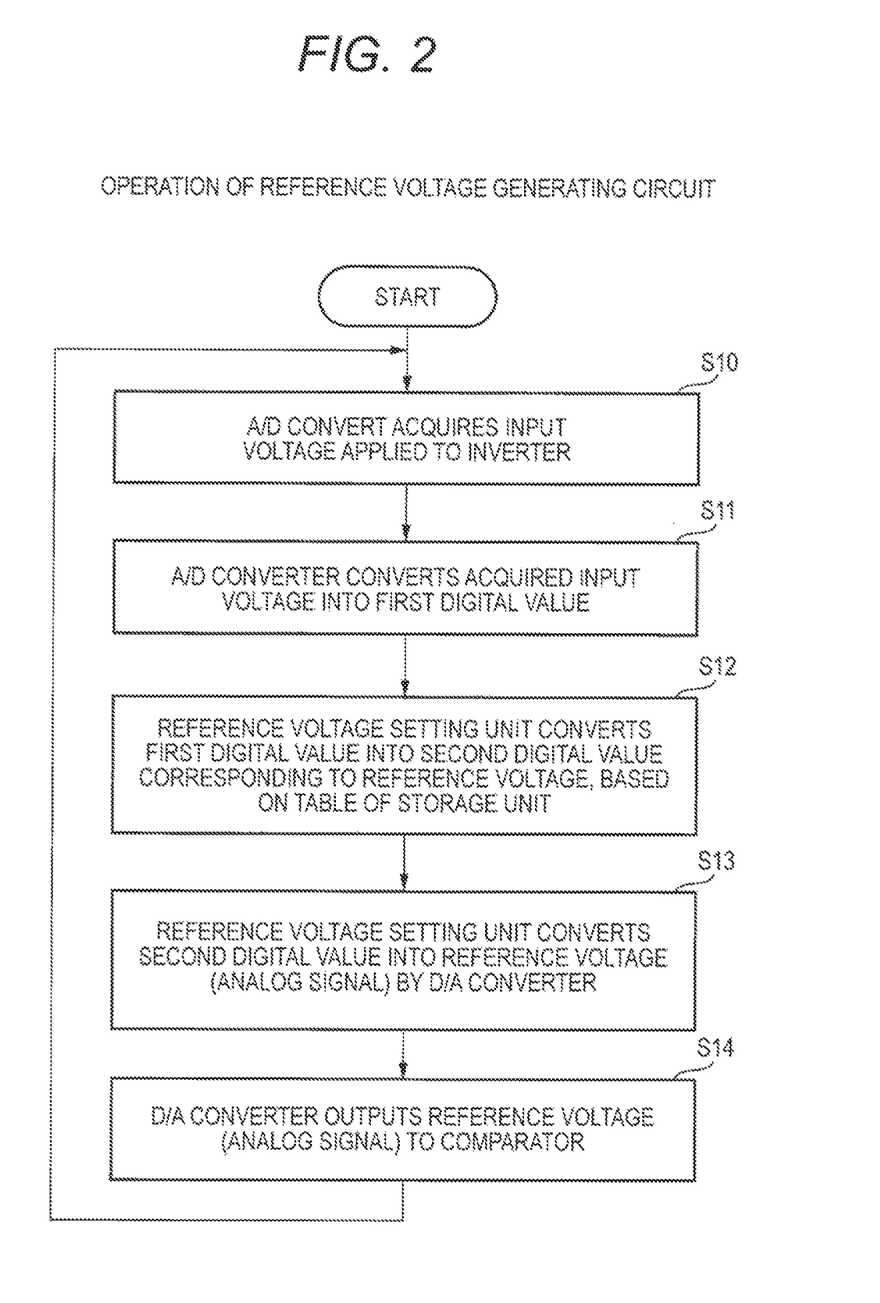
FIG. 2 is a flowchart illustrating the detailed operations of a reference voltage generating unit according to an illustrative embodiment.

FIG. 2 is a flowchart illustrating the detailed operations of a reference voltage generating unit 30 in the illustrative embodiment.

As the process starts, in Step S10, the A/D converter 32 acquires the input voltage Vcc applied to the inverter circuit 12 via the input voltage detection circuit 22. Actually, the input voltage Vcc2 (analog signal) obtained by dividing the input voltage Vcc is acquired.

In Step S11, the A/D converter 32 converts the input voltage Vcc2 (which is an analog signal) into a first digital value.

In Step S12, the reference voltage setting unit 33 converts the first digital value into a second digital value corresponding to the reference voltage Vref, based on a predetermined conversion table stored in the storage unit 31.

In Step S13, the reference voltage setting unit 33 converts the second digital value into the reference voltage Vref (analog signal) by the D/A converter 34.

In Step S14, the D/A converter 34 outputs the reference voltage Vref (analog signal) to the non-inverting input terminal of the comparator 41. When the operation in Step S14 ends, the entire process returns to Step S10, and then, the process in Steps S10 to S14 are repeated.

The reference voltage generating unit 30 may be configured by, for example, a micro-computer, so that, the operations in Steps S10 to S14 can be carried out by software. In this case, multiple predetermined conversion tables are stored in the storage unit 31. The reference voltage generating unit 30 switches those multiple predetermined conversion tables, depending on an operation mode of a device such as a normal mode and an energy saving mode, for example. With this configuration, the reference voltage generating unit 30 causes to suppress the breakdown of the circuit elements by performing over-current protection, over-voltage protection and over-power protection in accordance with a desired pattern. And, it may be possible to carry out energy saving operation by performing the over-power protection.

Figure 3:
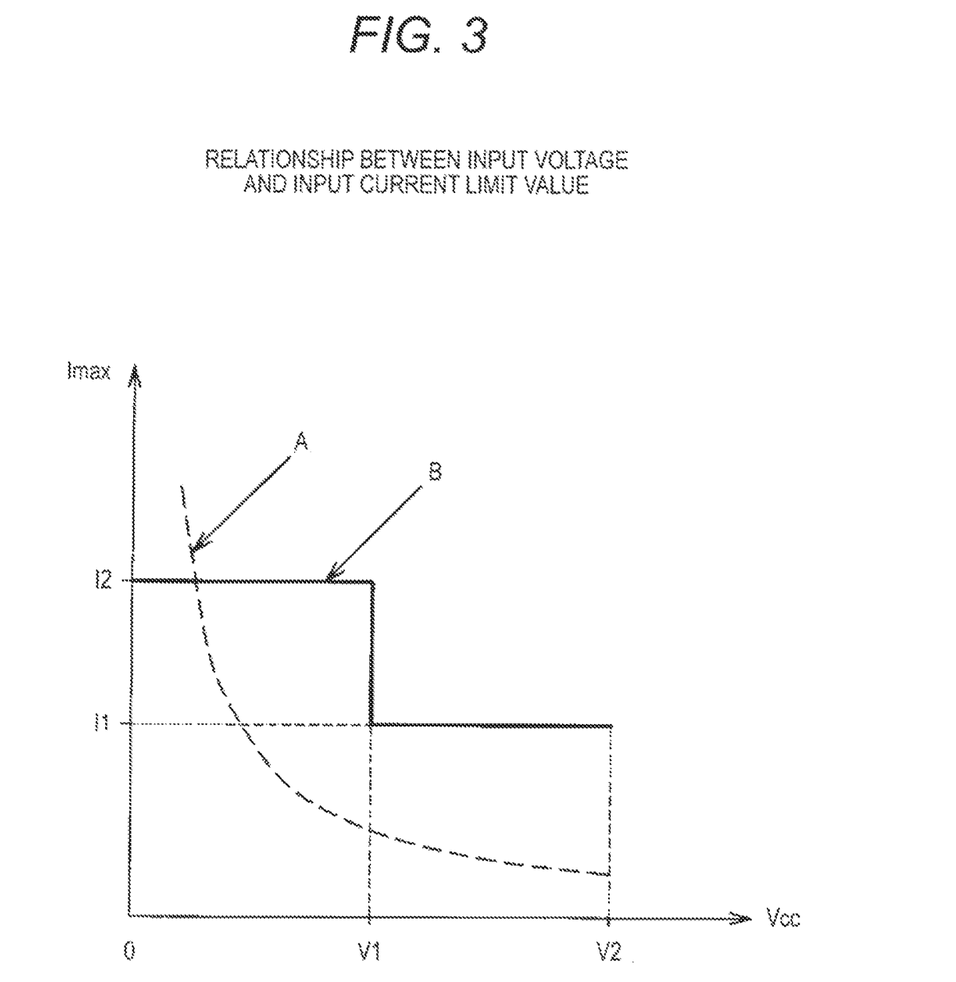
FIG. 3 is a graph illustrating a relationship between an input voltage and an input current limit value according to an illustrative embodiment.

FIG. 3 is a graph illustrating a relationship between an input voltage Vcc and an input current limit value Imax in the illustrative embodiment. Herein, the horizontal axis represents the input voltage Vcc and the vertical axis represents the input current limit value Imax.

Dashed line A in FIG. 3 represents the relationship between the input voltage Vcc and the input current limit value Imax when over-power protection is carried out in a comparative example. In this comparative example, the input current limit value Imax is varied according to the input voltage Vcc so as not to exceed a predetermined power consumption. At this time, the input current limit value Imax and the input voltage Vcc are in inverse proportion. When the value of the input voltage Vcc is small, the value of the input current limit value Imax is large. For this reason, there is a risk that failure of the inverter circuit 12 or the motor 13 can be caused.

Solid line B in FIG. 3 represents the relationship between the input voltage Vcc and the input current limit value Imax when over-power protection is carried out according to the illustrative embodiment. The input current limit value is limited to a constant current I2 when the input voltage Vcc is in a range of 0 to V1 [V]. The input current limit value is limited to a constant current I1 when the input voltage Vcc is in a range of V1 to V2 [V].

For example, a case where it is required to limit the maximum power to 350 [W] will be described. In this case, V1 is set to be equal to 50 [V] and V2 is set to be equal to 70 [V]. When the input voltage Vcc is in a range of 0 to 50 [V], the input current limit value Imax, i.e., I2 is equal to 7 [A]. When the input voltage Vcc is in a range of 50 to 70 [V], the input current limit value Imax, i.e., I1 is equal to 5 [A]. The input current limit value Imax can be determined such that the power does not exceed a predetermined power consumption of 350 [W] while considering the current limit value of the inverter circuit 12 or the motor 13. Accordingly, it is possible to simultaneously carry out the over-power protection and the over-current protection.

Effect of Illustrative Embodiment

According to the above-described illustrative embodiment, there can be achieved following (A) to (E) effects.

(A) The power controller 10 of the present illustrative embodiment can be set such that the input current Iin is limited according to the input voltage Vcc, and a power is limited to a desired maximum power according to the input voltage Vcc while using a simple and low-cost circuit configuration. Therefore, since it is possible to carry out control to prevent a large input current Iin from flowing even when the input voltage Vcc is low, it is possible to achieve an over-current protection function for avoiding circuit failure due to an over-current.

(B) In the power controller 10 of the present illustrative embodiment, the current limiting reference voltage Vref is determined by the detected input voltage Vcc. Therefore, it is possible to smoothly perform the over-current protection even when the power supply voltage is varied.

(C) In the power controller 10 of the present illustrative embodiment, the input current Iin is limited according to the input voltage Vcc to control a power consumption to be a desired value. Therefore, it is possible to achieve an energy-saving function for avoiding unnecessary consumption of power.

(D) The power controller 10 of the present illustrative embodiment can be applied to a device (for example, an air-conditioner, an electric fan, etc.) for driving the motor 13, and a power control function turning on/off an operation thereof according to the current and voltage (power) by the current-voltage control unit 20 is implemented thereto. In this manner, it is possible to easily achieve the function of energy-saving mode by turning on the power control function when the device is in an energy-saving mode.

(E) In the power controller 10 of the present illustrative embodiment, the temporal variation of the input voltage Vcc supplied from the DC power supply 11 as a constant voltage source tends to be moderate compared to the temporal variation of the input current Iin. That is, the reference voltage generating unit 30 first converts the input voltage Vcc, which is an analog value varying moderately, into a digital value and then outputs the reference voltage Vref as an analog value via digital processing. Although converting and processing the analog value into the digital value is accompanied with a certain delay, this is no problem since the temporal variation of the input voltage Vcc is moderate. In this manner, the over-current protection and over-power protection can be achieved at high speed by a simple circuit configuration in which the input current Iin having larger temporal variation is detected at the analog circuit, the detected input current is converted into a voltage Vin2 corresponding thereto, and then, the voltage Vin2 and the reference voltage Vref are compared at the analog circuit. Further, since the input voltage Vcc, which is an analog value, is first converted into a digital value and then converted into a digital value corresponding to the reference voltage Vref according to the input voltage Vcc by a logic processing, it is possible to increase the degree of freedom in setting the reference voltage Vref and to easily create/modify a conversion table.

Modified Illustrative Embodiment

The present invention is not limited to the above illustrative embodiments, and various modifications may be made in a range without departing from the gist of the present invention. For example, as a usage form or modification thereof, there are following (a) to (f) examples.

(a) The relationship between the input voltage Vcc and the input current limit value Imax in the power control of the present invention is not limited to the relationship illustrated in FIG. 3. For example, as illustrated in FIG. 4 (described later), it is possible to suppress the breakdown of the circuit elements by variously combining over-current protection, over-voltage protection and over-power protection, as necessary.

Figure 4A:
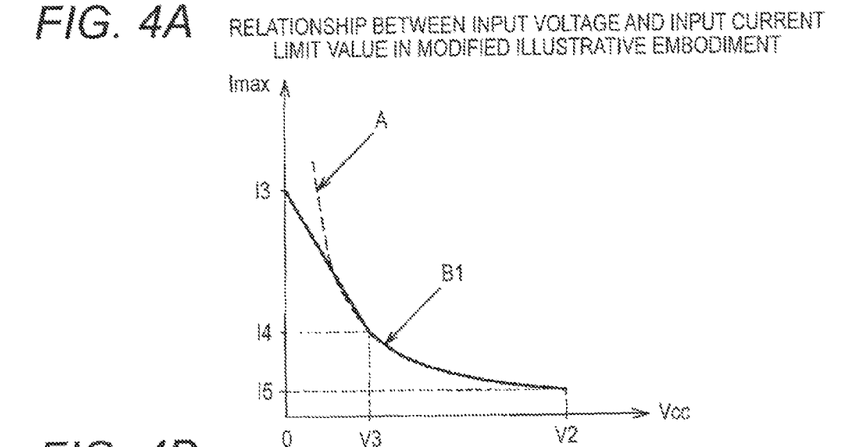
FIGS. 4A to 4C are graphs each illustrating a relationship between an input voltage and an input current limit value according to a modified illustrative embodiment.
Figure 4B:
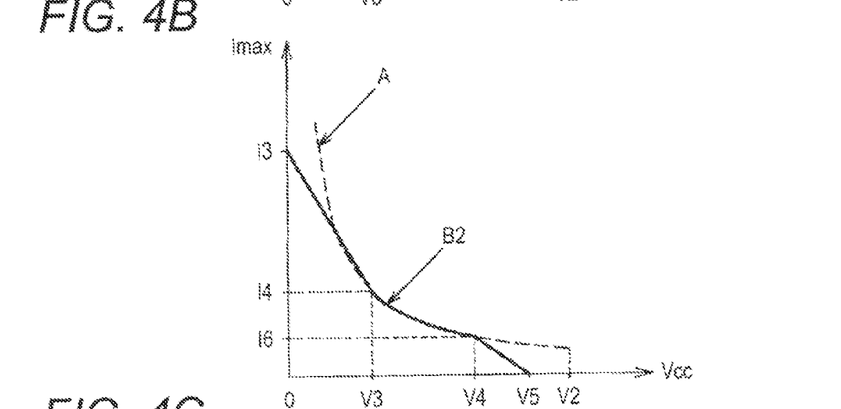
Figure 4C:
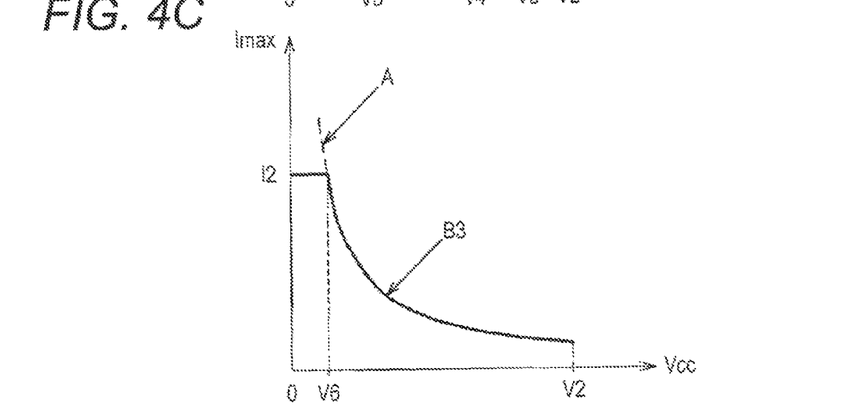

FIGS. 4A to 4C are graphs each illustrating a relationship between an input voltage Vcc and an input current limit value Imax according to a modified illustrative embodiment. In each of FIGS. 4A to 4C, the horizontal axis represents the input voltage Vcc and the vertical axis represents the input current limit value Imax.

The power controller according to the modified illustrative embodiment has the same configuration as the above-described power controller 10 illustrated in FIG. 1. A predetermined conversion table different from the conversion table in the above-described illustrative embodiment is stored in the storage unit 31. Dashed line A in FIGS. 4A to 4C represents the relationship between the input voltage Vcc and the input current limit value Imax when the over-power protection is carried out, similarly to the dashed line A in FIG. 3.

Solid line B1 in FIG. 4A represents an example where a predetermined over-current control is carried out when the input voltage Vcc is equal to or less than V3 and a predetermined over-power protection is carried out when the input voltage Vcc is higher than V3. With this configuration, the power controller according to this modified illustrative embodiment is capable of suppressing the breakdown of the circuit elements by performing the over-current protection and the over-power protection. And, the power controller is capable of carrying out energy saving operation by performing the over-power protection.

Solid line B2 in FIG. 4B represents an example where a predetermined over-current control is carried out when the input voltage Vcc is equal to or less than V3, a predetermined over-power control is carried out when the input voltage Vcc is in a range of V3 to V4 and a predetermined over-voltage control is carried out when the input voltage Vcc is higher than V4. With this configuration, the power controller according to this modified illustrative embodiment is capable of suppressing the breakdown of the circuit elements by performing the over-current protection, the over-voltage protection and the over-power protection. And, the power controller is capable of carrying out energy saving operation by performing the over-power protection.

Solid line B3 in FIG. 4C represents an example where an over-current control is carried out using I2 as the input current limit value Imax when the input voltage Vcc is equal to or less than V6, and an over-power control is carried out when the input voltage Vcc is higher than V6. With this configuration, the power controller according to this modified illustrative embodiment is capable of suppressing the breakdown of the circuit elements by performing the over-current protection and the over-power protection. And, the power controller is capable of carrying out energy saving operation by performing the over-power protection.

(b) Although the load connected to the inverter circuit 12 is the motor 13 in the above illustrative embodiment, the load is not limited to the motor. For example, the load may be an electronic load used in the power supply, etc.

(c) Although the power controller 10 of the above illustrative embodiment illustrated in FIG. 1 is configured to perform the switching operation of PWM signal by the switching element Q5, the power controller is not limited to such configuration. For example, a circuit or element having the same function as the switching element may be used.

(d) Although the reference voltage generating unit 30 of the above illustrative embodiment illustrated in FIG. 1 is configured to convert the first digital value into the second digital value corresponding to the reference voltage Vref based on the storage unit 31, the reference voltage generating unit is not limited to such a configuration. For example, the reference voltage generating unit may be configured to convert the first digital value into the second digital value corresponding to the reference voltage Vref such that a calculating unit is provided instead of the storage unit 31 and carries out calculation using a predetermined conversion formula. With this configuration, it is possible to convert the first digital value into the second digital value corresponding to the reference voltage Vref without using the storage capacity of the storage unit 31.

(e) Although the input voltage detection circuit 22 of the above illustrative embodiment illustrated in FIG. 1 is configured to convert the input voltage Vcc into the input voltage Vcc2 by the resistor voltage-dividing circuit and output the converted input voltage Vcc2 to the A/D converter 32, the input voltage detection circuit is not limited to such a configuration. For example, when the input voltage Vcc is equal to or less than the maximum allowable voltage of the A/D converter 32, the input terminal of the A/D converter 32 may be directly connected to the positive side of the DC power supply 11 or the positive side input terminal of the inverter circuit 12, instead of providing the input voltage detection circuit 22.

(f) Although the input voltage detection circuit 22 of the above illustrative embodiment illustrated in FIG. 1 is configured to convert the input voltage Vcc2 into the reference voltage Vref by a single predetermined conversion table, the input voltage detection circuit is not limited to such a configuration. For example, the input voltage detection circuit may convert the input voltage into the reference voltage by any one of multiple predetermined conversion tables, depending on the mode of operation of a device to which the power controller 10 is employed. With this configuration, the power controller according to such a modified illustrative embodiment is capable of suppressing the breakdown of the circuit elements by performing the over-current protection, the over-voltage protection and the over-power protection depending on the mode of operation of the device. And, the power controller is capable of carrying out energy saving operation by performing the over-power protection depending on the mode of operation of the device.

What is claimed is:

1. A power controller comprising:
a drive circuit connected to a DC power supply to apply a first voltage to the drive circuit and configured to supply power to an external load;
a current detection circuit configured to detect a current flowing in the drive circuit by converting the current into a second voltage corresponding to the current; and
a current-voltage control unit configured to generate a reference voltage based on the first voltage corresponding to a limit value of the current flowing in the drive circuit when the first voltage is applied to the drive circuit, and configured to control the drive circuit to operate in a desired current according to the first voltage, based on a comparison result of the reference voltage and the second voltage,
wherein the current-voltage control unit includes:
a reference voltage generating unit configured to generate and output the reference voltage;
a comparator configured to output a stop signal when the second voltage is greater than the reference voltage; and
a drive circuit control unit configured to control the drive circuit to stop the supply of power to the external load by the drive circuit when the stop signal is inputted.

2. The power controller according to claim 1,
wherein the reference voltage generating unit includes:
an A/D converter configured to convert the first voltage, which is an analog signal, into a first digital value;
a reference voltage setting unit configured to convert the first digital value into a second digital value corresponding to the reference voltage; and
a D/A converter configured to convert the second digital value into an analog signal which is the reference voltage.

3. The power controller according to claim 2,
wherein the reference voltage generating unit further includes:
a storage unit storing a conversion table which represents a corresponding relationship between the first voltage and the reference voltage, and
wherein the reference voltage setting unit is configured to convert the first digital value into the second digital value corresponding to the reference voltage, based on the conversion table.

4. The power controller according to claim 3,
wherein the storage unit stores a plurality of conversion tables different from each other, and each representing a corresponding relationship between the first voltage and the reference voltage,
wherein the reference voltage setting unit is configured to convert the first digital value into the second digital value corresponding to the reference voltage, based on one of the conversion tables which is selected according to a mode of operation.

5. The power controller according to claim 2,
wherein the reference voltage generating unit further includes:
a calculating unit configured to calculate the reference voltage from the first voltage by a conversion formula; and
wherein the reference voltage setting unit is configured to convert the first digital value into the second digital value corresponding to the reference voltage based on a calculation result of the calculating unit.

6. The power controller according to claim 1,
wherein the drive circuit is an inverter circuit, and
wherein the drive circuit control unit includes:
a PWM generating unit configured to generate a PWM signal;
a drive control unit configured to output a drive control signal to the inverter circuit according to a duty of the PWM signal; and
a switch unit configured to shut off an output of the PWM signal to the drive control unit when the stop signal is inputted from the comparator.

* * * * *